United States Patent [19]
Shaffer et al.

[11] Patent Number: 6,134,317
[45] Date of Patent: Oct. 17, 2000

[54] METHOD AND APPARATUS FOR IMPROVING UTILIZATION OF MULTIPLE PHONE LINES

[75] Inventors: Shmuel Shaffer, Palo Alto; William J. Beyda, Cupertino, both of Calif.

[73] Assignee: Siemens Information and Communication Networks, Inc., Boca Raton, Fla.

[21] Appl. No.: 08/902,795

[22] Filed: Jul. 30, 1997

[51] Int. Cl.$^7$ .............................. H04M 7/00; H04M 3/00; H04L 12/66

[52] U.S. Cl. .......................... 379/243; 379/220; 379/229; 370/355

[58] Field of Search ..................................... 379/229, 230, 379/243, 219, 221, 220; 370/355, 356

[56] References Cited

U.S. PATENT DOCUMENTS 5,610,910  3/1997  Focsaneanu et al. .................... 370/351

*Primary Examiner*—Scott Wolinsky
*Assistant Examiner*—David Huynh

[57] ABSTRACT

Methods and apparatus are described for routing transmissions from a plurality of transmission lines to a plurality of devices associated with the transmission lines. An incoming transmission is received via a first transmission line. Source information associated with the incoming transmission is determined and a data type of the incoming call is determined based on the source information. A routing protocol for the incoming transmission is then determined according to the data type and a transmission hierarchy. The incoming transmission is then routed according to the routing protocol.

26 Claims, 3 Drawing Sheets

METHOD AND APPARATUS FOR IMPROVING UTILIZATION OF MULTIPLE PHONE LINES

BACKGROUND OF THE INVENTION

The present invention relates to methods and apparatus for improving the efficiency with which different types of data are transmitted via a plurality of transmission lines. More specifically, the present invention provides methods and apparatus which allocate voice and data transmissions among two or more telephone lines according to a user specified hierarchy.

Currently, many residential consumers of telecommunications services have two telephone lines connected to their homes, the first one of which is used primarily for voice transmissions, and the second one of which is employed for a wide range of activities such as, for example, Internet access, faxing, and telecommuting. For the majority of users, the second line, often referred to as a data line, is idle much of the time resulting in an inefficient use of transmission resources. Moreover, if a voice transmission is occurring on the voice line, the user may miss a subsequent voice transmission because the line is occupied. One way of avoiding this, of course, is to receive voice transmissions via both lines. However, most users prefer not to give out the number for their second line because they want it to remain open for incoming data transmissions.

A number of service options are available from telecommunications providers which address some aspects of the problem described above. For example, "call-waiting" allows a user to receive an incoming voice call while engaged in a first voice call on the same line, and to switch between the two transmissions. Unfortunately, this requires affirmative action by the user. In addition, as will be understood by consumers of this service, manually screening every incoming call can be inconvenient. Another service, "automatic-busy-call-forwarding", automatically forwards an incoming call to a designated number, e.g., the user's data line, if the voice line is currently engaged. However, this solution runs contrary to the desire of most users to keep their data line open for incoming data transmissions. In addition, if the data line is occupied, the call cannot be forwarded and the service is defeated.

It is therefore desirable to provide a technique for allocating voice and data transmissions between two or more phone lines based on a particular user's priorities, the implementation of which is transparent to the user.

SUMMARY OF THE INVENTION

According to the present invention, methods and apparatus are provided by which incoming calls on either of a user's voice and data line are screened. The nature of the call, e.g., voice or data, is determined along with the priority of the call as dictated by a user specified hierarchy. Whether to present the call, and on which line are then determined based on the call type and priority. The present invention allows the end user of telecommunications services a high degree of flexibility in creating a call handling protocol which fits his or her needs. At the same time, the user's transmission resources are used more efficiently.

According to specific embodiments, the present invention may be employed with a variety of currently available phone services to effect a wide variety of call handling protocols. For example, "caller-ID" information accompanying an incoming call may be employed to identify the origin of a call, and to thereby determine the type of the call. Or, for example, "call-transfer" and "call-forwarding" may be employed in different circumstances to switch an incoming call from one line to another.

Thus, according to the invention, methods and apparatus are described for routing transmissions from a plurality of transmission lines to a plurality of devices associated with the transmission lines. An incoming transmission is received via a first transmission line. Source information associated with the incoming transmission is determined and a data type of the incoming call is determined based on the source information. A routing protocol for the incoming transmission is then determined according to the data type and a transmission hierarchy. The incoming transmission is then routed according to the routing protocol.

A further understanding of the nature and advantages of the present invention may be realized by reference to the remaining portions of the specification and the drawings.

DESCRIPTION OF SPECIFIC EMBODIMENTS

The operation of a specific embodiment of the invention will now be described with reference to FIG. 1 and the flowcharts of FIGS. 2a and 2b. This example assumes a residence having two incoming phone lines, lines 1 and 2, each of which have the "caller-ID", "call-waiting with caller-ID", and "call-transfer" services activated. As used herein, the term "caller-ID" refers to a service which provides information about the origin of an incoming transmission which may include, for example, the caller's name and phone number and/or whether the call was forwarded from another number. In the case of a digital line, such a service may include ISDN information elements relating to the called party.

Figure 1:
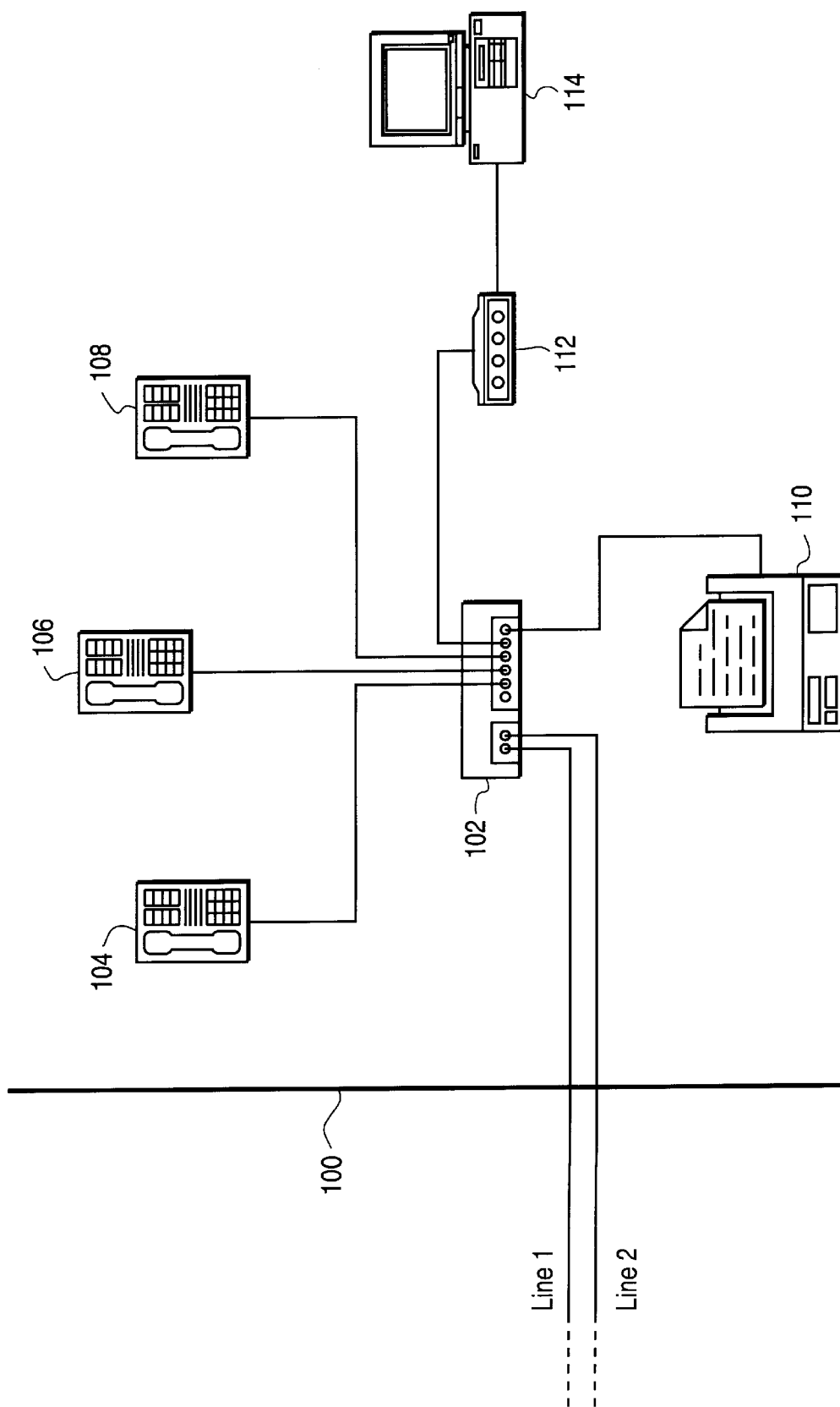
FIG. 1 is a block diagram illustrating an environment in which the call handling controller of the present invention may be employed.

Referring to FIG. 1, phone lines 1 and 2 enter a residence 100 and are connected to call handling controller 102. It will be understood that lines 1 and 2 may be any of a variety of line types including, for example, analog phone lines or digital ISDN lines. In this example, line 1 is dedicated primarily for voice transmission, and line 2 is primarily dedicated primarily for data transmission. That is, the user provides her contacts with the number for line 1 for voice calls and the number for line 2 for faxes and other data transmissions. Controller 102, which may comprise, for example, a private branch exchange (PBX), is connected to a plurality of local devices including telephone extensions 104, 106 and 108, fax machine 110, and modem 112 which is, in turn, connected to personal computer (PC) 114. As will be discussed, controller 102 may be configured to take advantage of the services associated with each line and to allocate voice and data transmissions among the devices according to a user-specified hierarchy.

Call handling on line 1 (flowchart 200) will now be described with reference to FIG. 2a. When call handling controller 102 receives an incoming call on line 1 (step 202) and line 1 is not busy with another call (step 204), it checks the "caller-ID" information associated with the call (step 206). If the call was not forwarded from line 2 (step 208), it is assumed to be a voice transmission and, if at least one of phones 104, 106 and 108 is available (step 210), the ring voltage is provided (step 211), and the incoming call is passed through to whichever phone is answered (step 212). If all the phones are busy (or the call is never answered), the call is routed to a local or central office message server (step 213).

If, on the other hand, the "caller-ID" information indicates that incoming call on line 1 was forwarded from line 2 (step 208), it is assumed to be a data transmission and standard techniques are employed to screen the call to determine whether it is intended for the fax or the modem (step 214). If the intended destination is not busy (step 216), the call is transmitted to the device (step 218). Otherwise the call is left unanswered (step 220). The call can optionally be routed to a local or central office message server.

If at step 204, line 1 is busy with another call, i.e., the incoming call is received as a "call-waiting" transmission, the controller checks the "caller-ID" information (step 222). If the "caller-ID" information indicates that the call was forwarded from line 2 (step 224), it is assumed to be a data or fax transmission. Because, in this example, the controller is configured to assign greater priority to voice transmissions, the call is left unanswered (step 220). As stated above, the call may optionally be routed to a local or central office message server. Another alternative, is to configure the controller to inform the user of the incoming data call, provide information about the call, and offer the user the option of terminating the voice call in progress and to accept the incoming call.

If, on the other hand, the "caller-ID" information indicates that the incoming call is for line 1, i.e., was not forwarded from line 2, it is assumed to be a voice transmission, and the "caller-ID" information is provided to the user, e.g., on a display screen or audibly (step 226), and the user is offered options for handling the call (step 228) which may include, for example, terminating the call in progress and taking the incoming call, routing the incoming call to a message server, forwarding the call to line 2, and leaving the call unanswered. The call is then handled according to the handling option selected by the user (step 230).

Figure 2A:
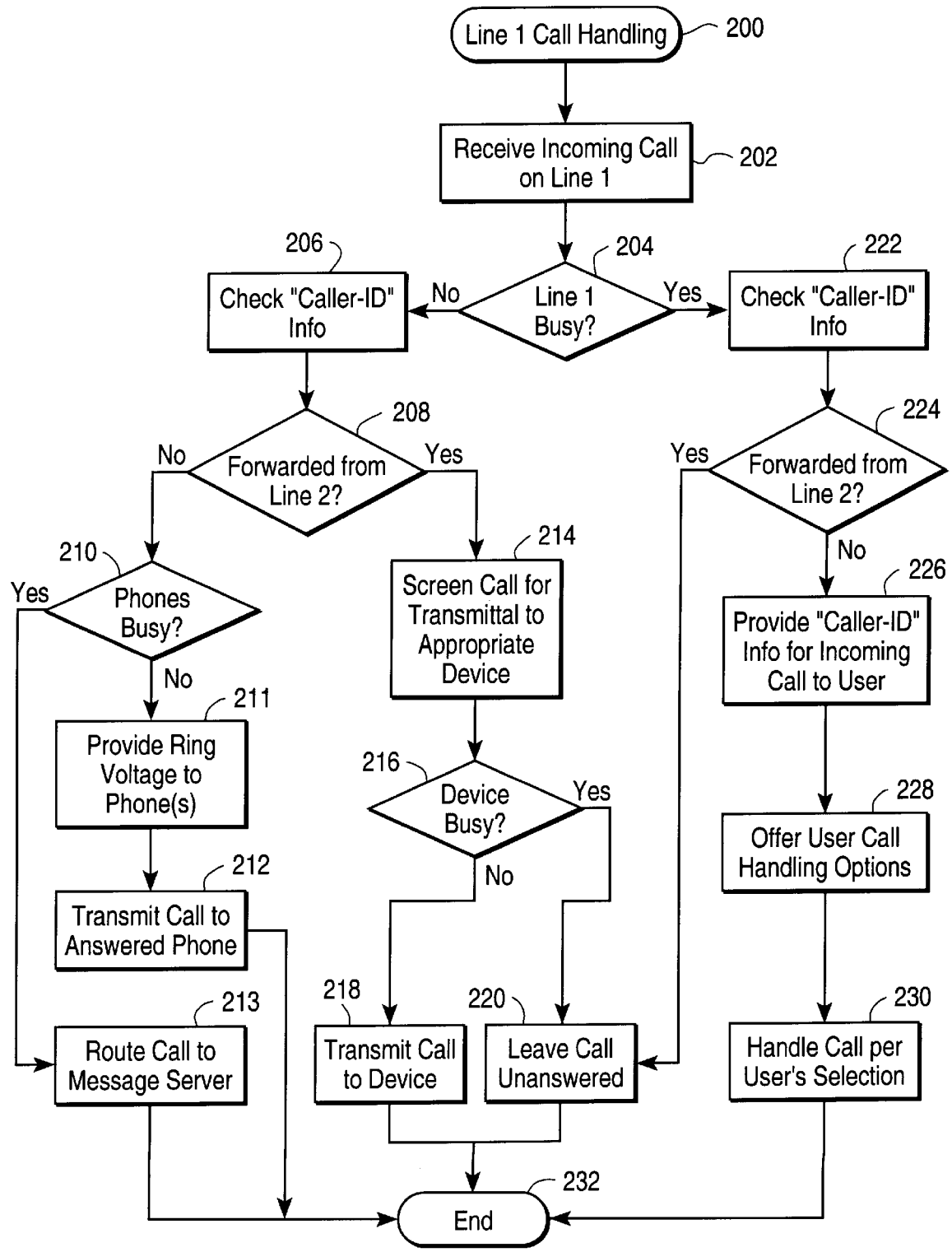
FIGS. 2a and 2b are flowcharts illustrating the operation of a specific embodiment of call handling controller of the present invention.
Figure 2B:
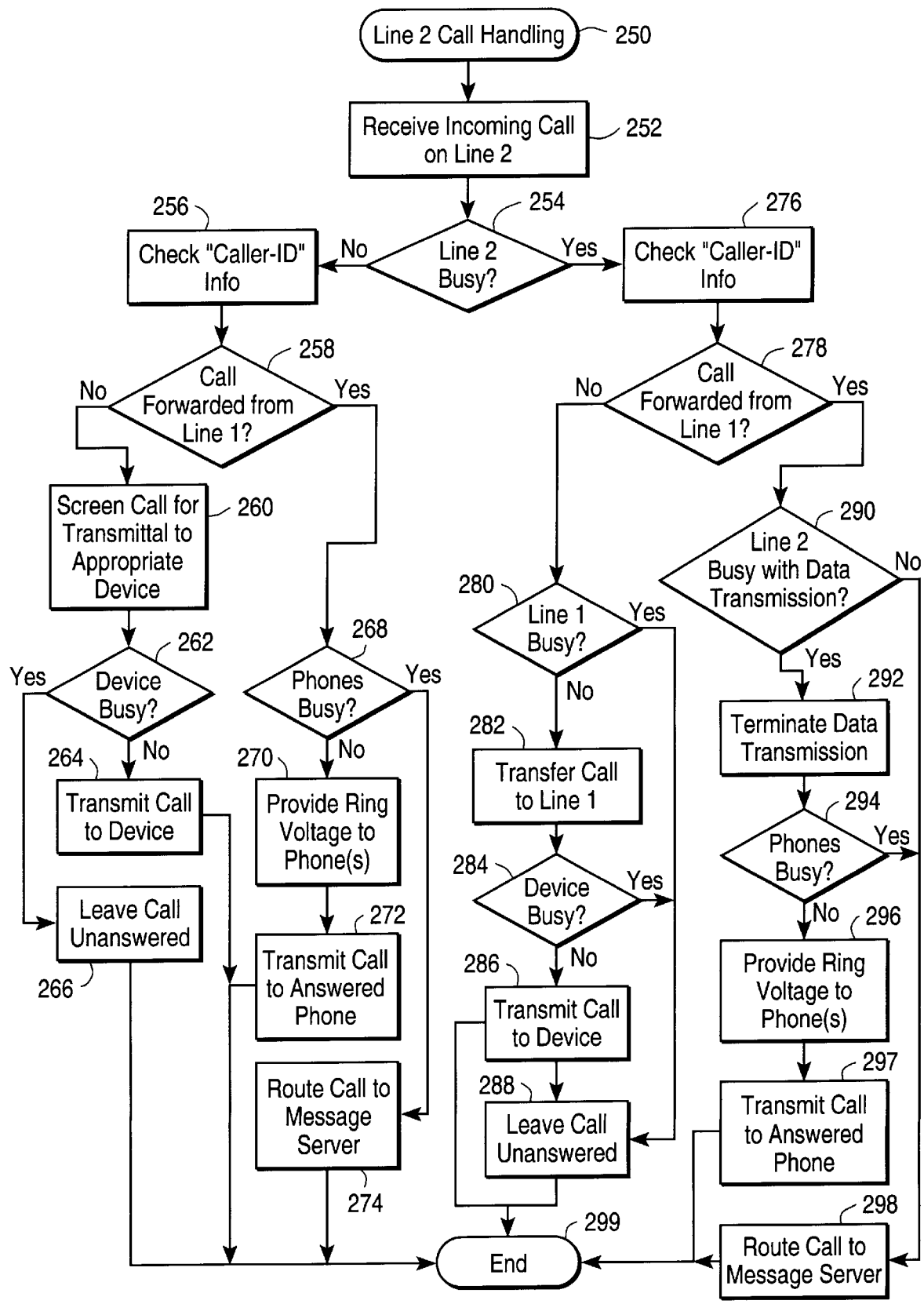

The flowchart of FIG. 2b describes the operation of the invention when a call comes in on line 2 (flowchart 250). Because, in this example, line 2 is primarily for fax and modem transmissions, it is assumed that these devices do not have the capability of making call handling decisions. Thus, the call handling is set up in advance and the user notification described above with reference to FIG. 2a does not occur. When controller 102 receives an incoming call on line 2 (step 252) and line 2 is not busy with another call (step 254), the controller checks the "caller-ID" information associated with the call (step 256). If the call was not forwarded from line 1 (step 258), it is assumed to be a data transmission and is screened for transmittal either to fax machine 110 or modem 112 as appropriate (step 260). If the intended device is not already handling another call (step 262), the call is transmitted to the appropriate device (step 264). If the device is busy, the call is left unanswered (step 266). Alternatively, the call can be routed to a local or central office message server.

If the call was forwarded from line 1 (step 258), it is assumed to be a voice transmission and the controller attempts to route it to any of the currently available phone extensions. A voice call may be forwarded from line 1 to line 2 where, for example, the user has selected this option as described above with reference to step 224 of FIG. 2a. If at least one of the phone extensions is available (step 268), the controller provides the ring voltage (step 270) and transmits the call to the answered phone (step 272). If the phones are busy (or the call is never answered), the call is routed to a local or central office message server (step 274).

If at step 254, line 2 is busy with another call, i.e., the incoming call is received as a "call-waiting" transmission, the controller checks the "caller-ID" information (step 276). If the call was not forwarded from line 1 (step 278), it is assumed to be a data call and the controller checks to see whether line 1 is available (step 280). If line 1 is free, the controller issues a transfer command thereby transferring the call from line 2 to line 1 (step 282). If the intended device is available (step 284), the call is transmitted to the device (step 286). If, however, the device is busy handling another call, the call is left unanswered (step 288). Alternatively, the call can be routed to a local or central office message server.

If the call was forwarded from line 1 (step 278), it is assumed to be a voice transmission and, in this example, to have precedence over any ongoing data transmission. Therefore, if line 2 is currently busy with a data transmission (step 290), the data transmission is terminated (step 292) and the incoming call is routed to any of the currently available phone extensions. If at least one of the phone extensions is available (step 294), the controller provides the ring voltage (step 296) and transmits the call to the answered phone (step 297). If all the phones are busy (or the call is never answered), the call is routed to a local or central office message server (step 298). Also, if line 2 is busy with a voice transmission (step 290), the incoming voice transmission is routed to a message server.

According to the invention, controller 102 of FIG. 1 may be configured to handle calls according to a priority hierarchy defined by the user. For example, in the embodiments described above with reference to FIGS. 2a and 2b, voice transmissions are given priority over data transmissions. Thus, for example, when a call is forwarded to line 1 from line 2 (step 224) it is assumed to be a data transmission and, if line 1 is busy, the call is not answered because the call currently on line 1 is most likely a voice transmission. Similarly, when a call is forwarded from line 1 to line 2 (step 278) it is assumed to be a voice transmission and, if line 2 is busy with a data transmission (step 290), the data transmission is terminated in favor of the incoming voice transmission (steps 292–297).

It should also be apparent from FIGS. 2a and 2b that, for the described embodiments, ongoing voice transmissions are given the highest priority with the exception that a user could override this priority if she preferred to terminate an ongoing call to receive an incoming voice transmission (steps 224–230). So, for example, even if an incoming call is forwarded from line 1, i.e., is a voice transmission (step 278), and line 2 is busy with a voice transmission (step 290), the incoming voice transmission is routed to a message server (step 298).

Notwithstanding the priority hierarchy which may be inferred from FIGS. 2a and 2b, a number of variations of this hierarchy may be implemented and remain within the scope of the invention. That is, the specific embodiments of the user-defined priority hierarchy described above, which include incoming and ongoing data transmissions and incoming and ongoing voice transmissions, may organize these transmission types in a variety of ways. For example, ongoing data transmissions may be given the highest priority, followed by ongoing voice transmissions, then incoming voice transmissions, and finally incoming data transmissions. Or, two transmission types, e.g., incoming data and incoming voice transmissions, may be assigned the same priority level. In such a case, the first in time would prevail.

In addition, according to other specific embodiments, the categories of transmission types may be subdivided and/or refined into more detailed categories for which the user may define a more detailed priority hierarchy. So, for example, data transmissions may include video-conferencing transmissions, internet-content transmissions, and fax transmissions. A priority hierarchy including these categories might give video-conferencing transmissions the highest priority over even voice transmissions. Other categories of transmission types may also be employed without departing from the scope of the invention.

While the invention has been particularly shown and described with reference to specific embodiments thereof, it will be understood by those skilled in the art that changes in the form and details of the disclosed embodiments may be made without departing from the spirit or scope of the invention. Specifically, the present invention may operate differently depending upon the priority hierarchy specified by the user. For example, the embodiment described above with reference to FIGS. 2a and 2b assumed that the user had specified that voice transmissions have precedence over all data transmissions. However, a user may alternatively specify that ongoing data transmissions have precedence over incoming voice transmissions and that therefore such a data transmission should not be terminated.

Moreover, the embodiments described above make a determination as to the type of transmission, i.e., data or voice, with reference to which line the call was originally directed. That is, the "caller-ID" information is checked to determine if the call was forwarded from the other line or intended for the line on which it was received. Based on this information and the fact that one line is primarily dedicated to voice transmissions and the other to data transmissions, the controller determines that a transmission is either voice or data. It will be understood, however, that other means for determining the transmission type may be employed without departing from the scope of the invention. For example, the signal characteristics of an incoming transmission may be analyzed to determine its type. Or, for a digital transmission line, incoming transmission types may be identified by data headers. Therefore, the scope of the invention should be determined with reference to the appended claims.

What is claimed is:

1. A method for routing transmissions from a plurality of transmission lines to a plurality of devices associated with the transmission lines, the method comprising:
   receiving an incoming transmission via a first transmission line primarily dedicated for data transmissions;
   determining the incoming transmission is a voice transmission where the incoming transmission is originally presented on a second transmission line primarily dedicated for voice transmissions, and where the incoming transmission is forwarded to the first transmission line from the second transmission line;
   determining a routing protocol for the incoming transmission according to a transmission hierarchy; and
   routing the incoming transmission according to the routing protocol.

2. The method of claim 1 wherein determining the incoming transmission is a voice transmission comprises:
   determining source information associated with the incoming transmission;
   determining the incoming transmission is a voice transmission based on the source information; and
   determining the routing protocol at least in part with reference to the incoming transmission being a voice transmission.

3. The method of claim 2 wherein determining source information comprises analyzing the incoming transmission.

4. The method of claim 2 wherein determining source information comprises reading information associated with the incoming transmission.

5. The method of claim 4 wherein the information comprises a data header.

6. The method of claim 4 wherein the information comprises source information regarding a source of the incoming transmission.

7. The method of claim 2 wherein determining a routing protocol further comprises determining a priority level for the incoming transmission from the transmission hierarchy based at least in part with reference to the incoming transmission being a voice transmission.

8. The method of claim 1 wherein receiving an incoming transmission comprises receiving notification of the incoming transmission during an ongoing transmission.

9. The method of claim 1 further comprising setting up the transmission hierarchy according to a user-defined priority hierarchy.

10. The method of claim 1 wherein the transmission hierarchy relates priority levels for a plurality of transmission types.

11. A call handling device for routing transmissions from a plurality of transmission lines to a plurality of devices associated with the transmission lines, comprising:
    a receiver for receiving an incoming transmission via a first transmission line; and
    a controller coupled to the receiver for:
    determining the incoming transmission is a voice transmission where the incoming transmission is originally presented on a second transmission line primarily dedicated for voice transmissions, and where the incoming transmission is forwarded to the first transmission line from the second transmission line;
    determining a routing protocol for the incoming transmission according to a transmission hierarchy; and
    routing the incoming transmission according to the routing protocol.

12. The call handling device of claim 11 wherein said receiver is operable to receive notification of the incoming transmission during an ongoing transmission.

13. The call handling device of claim 12 wherein the controller is further operable to determine whether the incoming call should be forwarded from the second transmission line to the first transmission line with reference to the transmission hierarchy and respective transmission types associated with the incoming and ongoing transmissions.

14. A call handling device for routing transmissions from a plurality of transmission lines to a plurality of devices associated with the transmission lines, comprising:
    a receiver for receiving an incoming transmission on a first transmission line; and
    a controller coupled to the receiver for:
    determining the incoming transmission is a data transmission where the incoming transmission is originally presented on a second transmission line primarily dedicated for data transmissions, and where the incoming transmission is forwarded to the first transmission line from the second transmission line;
    determining a routing protocol for the incoming transmission according to a transmission hierarchy; and routing the incoming transmission according to the routing protocol.

15. The call handling device of claim 14 wherein said receiver is operable to receive notification of the incoming transmission during an ongoing transmission.

16. The call handling device of claim 15 wherein the controller is further operable to determine whether the incoming call should be forwarded from the second transmission line to the first transmission line with reference to the transmission hierarchy and respective transmission types associated with the incoming and ongoing transmissions.

17. A method for routing transmissions from a plurality of transmission lines to a plurality of devices associated with the transmission lines, the method comprising:

receiving an incoming transmission via a first transmission line primarily dedicated for voice transmissions;

determining the incoming transmission is a data transmission where the incoming transmission is originally presented on a second transmission line primarily dedicated for data transmissions, and where the incoming transmission is forwarded to the first transmission line from the second transmission line;

determining a routing protocol for the incoming transmission according to a transmission hierarchy; and routing the incoming transmission according to the routing protocol.

18. A method as recited in claim 17 wherein determining the incoming transmission is a data transmission comprises:

determining source information associated with the incoming transmission;

determining the incoming transmission is a data transmission based on the source information; and determining the routing protocol at least in part with reference to the incoming transmission being a data transmission.

19. The method of claim 18 wherein determining source information comprises analyzing the incoming transmission.

20. The method of claim 18 wherein determining source information comprises reading information associated with the incoming transmission.

21. The method of claim 20 wherein the information comprises a data header.

22. The method of claim 20 wherein the information comprises source information regarding a source of the incoming transmission.

23. The method of claim 18 wherein determining a routing protocol comprises determining a priority level for the incoming transmission from the transmission hierarchy based on the transmission type.

24. The method of claim 17 wherein receiving an incoming transmission comprises receiving notification of the incoming transmission during an ongoing transmission.

25. The method of claim 17 further comprising setting up the transmission hierarchy according to a user-defined priority hierarchy.

26. The method of claim 17 wherein the transmission hierarchy relates priority levels for a plurality of transmission types.

* * * * *